United States Patent [19]

Cormier

[11] 4,081,903
[45] Apr. 4, 1978

[54] CABLE STRIPPER

[76] Inventor: Joseph Tilmon Cormier, 1130 Main St., Tewksbury, Mass. 01876

[21] Appl. No.: 699,983

[22] Filed: Jun. 25, 1976

[51] Int. Cl.² .................. B21F 13/00; B26B 27/00
[52] U.S. Cl. ............................. 30/90.6; 30/90.8; 30/293; 30/294
[58] Field of Search .............. 30/90.6, 90.8, 90.4, 30/293, 294

[56] References Cited

U.S. PATENT DOCUMENTS

| 2,050,439 | 8/1936 | Marx | 30/293 X |
| 2,089,528 | 8/1937 | Barycz | 30/294 UX |
| 2,380,725 | 7/1945 | Crowder | 30/90.6 X |
| 2,616,172 | 11/1952 | Parker | 30/294 X |
| 2,978,934 | 4/1961 | Bradley | 30/90.8 |
| 3,169,315 | 2/1965 | Mankovitz | 30/90.6 |
| 3,431,645 | 3/1969 | Powell | 30/90.6 |
| 3,624,901 | 12/1971 | Pettit et al. | 30/90.4 |
| 3,889,368 | 6/1975 | Himeno | 30/294 |
| 3,922,779 | 12/1975 | Cormier | 30/90.8 |
| 4,020,550 | 5/1977 | Okada | 30/294 |

FOREIGN PATENT DOCUMENTS 1,128,090  4/1962  Germany ................. 30/293

Primary Examiner—James L. Jones, Jr.
Assistant Examiner—J. T. Zatarga
Attorney, Agent, or Firm—Charles R. Fay

[57] ABSTRACT

A cable stripper having a handle, a removable sharp stripping blade therein, a cable guide including a tang mounted in the handle and secured therein with the blade by a single fastener, the cable guide comprising a laterally extended portion from the tang, said portion extending forwardly down and around the stripping blade in spaced relationship thereto. The guide then extends upwardly past the stripping blade, so that it avoids the necessity for the user's thumb to be placed on the cable near the stripping blade.

4 Claims, 4 Drawing Figures

U.S. Patent     April 4, 1978     4,081,903
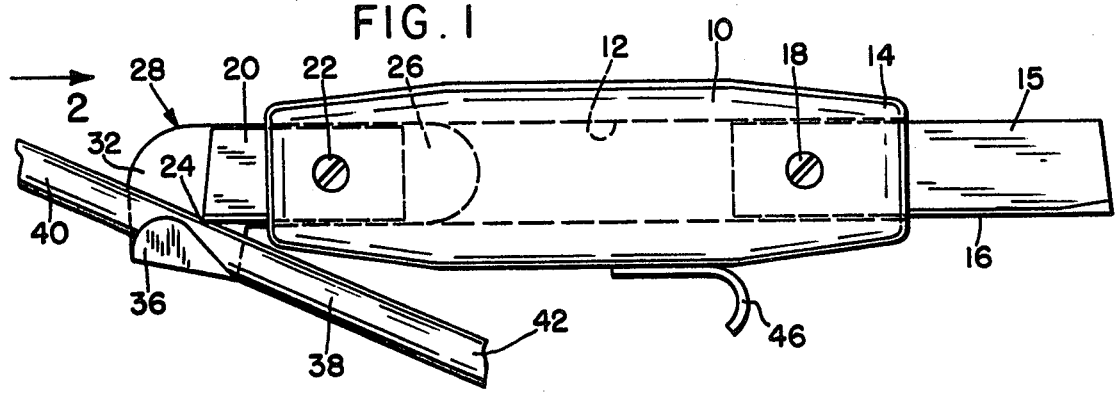
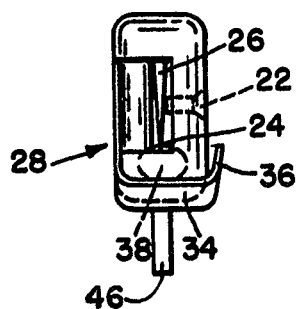
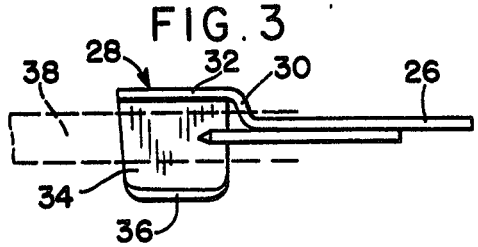
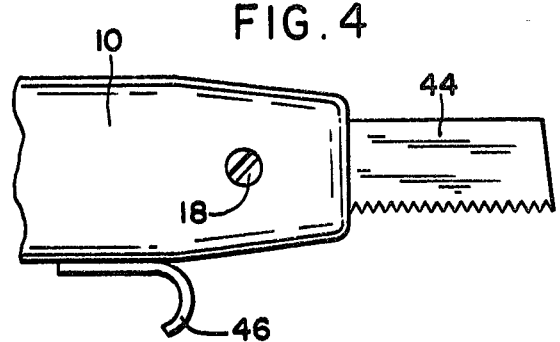

CABLE STRIPPER

BACKGROUND OF THE INVENTION

This is an improvement on my prior U.S. Pat. No. 3,898,733 dated Aug. 12, 1975, in which the cable guide was mounted directly on the stripping blade. The present case makes a more practical tool in which no thumb or finger of the user need be placed adjacent to a stripping edge or point, thereby providing greater safety during the cable slitting action.

SUMMARY OF THE INVENTION

An elongated handle is provided in which there is a through passage from end to end thereof. A removable cable cutting and stripping blade is fastened in the passage at one end of said handle, and at the opposite end of the handle there is a removable cable stripping blade having a point held in place by a screw fastener mounted in the handle. This fastener at the same time holds in place the cable guide which comprises a elongated tang associated with said blade and held to the handle by said screw fastener, said tang having a portion extending laterally of the blade of the handle exteriorly of said handle, said offset portion extending forwardly and down in spaced relation to said stripping blade passing underneath the same and then upwardly at the opposite side thereof forming a cable stripping point avoiding any need of a finger or thumb of the user pressing on the cable being stripped.

DESCRIPTION OF THE FIGURES

FIG. 1 is a view in side elevation showing the invention;

FIG. 2 is an end elevation looking in the direction of arrow 2 in FIG. 1;

FIG. 3 is a top plan view showing the cable guide and the stripping point in association; and FIG. 4 is a partial view illustrating a replacement blade.

PREFERRED EMBODIMENT OF THE INVENTION

An elongated handle 10 is provided with an end to end through passage 12. At the right end of the handle 14, as seen in FIG. 1, cutting and slicing blade 15 having a sharp edge 16 is held in position as by a screw fastener 18. This blade may be removed or replaced as for instance by a saw blade or the like.

At the other end of the passage 12 there is inserted a cable stripping blade 20 held by a fastener 22 and having a stripping point 24. Also secured by fastener 22 is the tang 26 of a cable guide generally indicated at 28. This guide includes an offset portion 30 extending laterally from tang 26 and forwardly as at 32 as well as downwardly to a bottom indicated at 34, see FIGS. 2 and 3. This bottom may slant upwardly to facilitate the stripping action and extends transversely across and underneath in spaced relation to the point 24 of the cable stripper 20 and terminates in an upwardly directed guiding member 36 also spaced from the point 24. The fastener 22 holds both the blade 20 and the cable guide tang in position so that there may be relative adjustment of the position 24 of the cable stripping point with relation to the guide and particularly the guide floor 34 and the side edge guide 36.

In the use of the device the cable 38 is shoved laterally in under or behind lip 36 until it assumes the position shown in FIGS. 1 and 2, whereupon it is merely necessary to slightly raise the end of the cable which is indicated at 40 in FIG. 1 and draw the entire tool held for instance in the right hand against the cable held in the left hand to strip the same to the end of the cable at 42. The cable is then removed, turned over, and loaded back into the guide whereupon the other aspect of the cable is slit. After that it is only necessary to use blade edge 16 to sever the slit casing from the wire and to then strip the paper from the wire by the same edge 16.

It will be seen that a very simple tool has been provided which has some degree of adjustment between the cable stripper and the cable guide accommodating different sizes of cable as well as individual inclinations. It is very easy to use and it is simple and accurate to operate and safe, because neither finger nor thumb of the operator comes any where near the cutting point 24.

The blade 15 may be removed and the saw blade 44 replaced for working on electric boxes or the like, as shown in FIG. 4.

A finger guard 46 may be attached to the handle 10 adjacent blade 15 to prevent the operator's hand slipping and injuring a finger. Also, is handy to aid if necessary in pulling the slitter to slit the cable.

I claim:

1. A cable stripper comprising an elongated handle having a passage therethrough, a cable slitting blade located in said passage and extending from an end thereof, said blade having an exposed sharpened point, a cable guide comprising a tang in said passage aligned with said blade in said passage, said tang having a laterally extending portion outside said passage, said laterally extending portion being directed away from said point, a downwardly and forwardly extending portion on the laterally extending portion spaced from said blade, said forwardly and downwardly extending portion including a transverse floor thereon at a point spaced from said sharpened point, and an upwardly directed cable guide portion terminating the floor, and releasable means securing the blade and cable guide to the handle, said floor being slightly inclined with relation to said cable stripping blade, the releasable means comprising a single screw fastener extending through one side of the passage and laterally abutting the side of one of said cable stripping blade and said cable guide tang for forcing both of the latter elements against the opposite side of said passage thereby securing said cable stripping blade and cable guide in longitudinally adjusted position, the blade and the guide being longitudinally adjustable relative to each other, and said cable stripping blade and the cable guide being separate and removable from the handle.

2. The cable stripping guide of claim 1 including a second blade extending outwardly from the handle at the opposite end thereof.

3. The cable stripper of claim 2 wherein said second blade is sharpened.

4. The cable stripper of claim 2 wherein said second blade is serrated for sawing.

* * * * *